United States Patent
Pi et al.

(10) Patent No.: US 12,286,094 B2
(45) Date of Patent: Apr. 29, 2025

(54) HYBRID ELECTRIC VEHICLE AND METHOD OF CONTROLLING THE SAME

(71) Applicants: Hyundai Motor Company, Seoul (KR); Kia Corporation, Seoul (KR)

(72) Inventors: Jae Myoung Pi, Suwon-Si (KR); Jong Bum Oh, Gwacheon-Si (KR); Seung Wan Son, Suwon-Si (KR); Soo Bang Lee, Suwon-Si (KR); Seul Gi Lee, Hwaseong-Si (KR)

(73) Assignees: Huyndai Motor Company, Seoul (KR); Kia Corporation, Seoul (KR)

( * ) Notice: Subject to any disclaimer, the term of this patent is extended or adjusted under 35 U.S.C. 154(b) by 280 days.

(21) Appl. No.: 17/946,897

(22) Filed: Sep. 16, 2022

(65) Prior Publication Data
US 2023/0311844 A1 Oct. 5, 2023

(30) Foreign Application Priority Data
Apr. 4, 2022 (KR) .................. 10-2022-0041752

(51) Int. Cl.
*B60W 20/00* (2016.01)
*B60W 20/15* (2016.01)

(52) U.S. Cl.
CPC ..... *B60W 20/15* (2016.01); *B60W 2510/0657* (2013.01); *B60W 2510/083* (2013.01);
(Continued)

(58) Field of Classification Search
CPC ......... B60W 20/15; B60W 2510/0657; B60W 2510/083; B60W 2510/1015;
(Continued)

(56) References Cited

U.S. PATENT DOCUMENTS 6,740,002 B1 * 5/2004 Stridsberg .............. B60W 10/11
903/910
8,731,753 B2 5/2014 Smith et al.
(Continued)

FOREIGN PATENT DOCUMENTS

| JP | 2000-0236601 | 8/2000 |
|---|---|---|
| KR | 10-2011-0139611 | 12/2011 |
| KR | 10-1209731 | 12/2012 |
| KR | 10-1475642 | 12/2014 |

*Primary Examiner* — Bao Long T Nguyen
*Assistant Examiner* — Tien Minh Le
(74) *Attorney, Agent, or Firm* — Morgan, Lewis & Bockius LLP

(57) ABSTRACT

A hybrid vehicle and a method of controlling the same, are configured for more efficiently distributing driving power for respective driving sources. The method of controlling a hybrid electric vehicle may include determining an engine operating point in a hybrid electric vehicle (HEV) mode, and determining first torque for a first motor and second torque for a second motor based on engine torque according to the engine operating point, required torque, and a speed of an input end of a transmission, the first motor may be directly connected to the engine, the second motor may be directly connected to the input end of the transmission, and the first motor and the second motor may be connected in the predetermined drive mode using driving power of the engine.

16 Claims, 5 Drawing Sheets

(52) U.S. Cl.
CPC ............... *B60W 2510/1015* (2013.01); *B60W 2710/0666* (2013.01); *B60W 2710/083* (2013.01)

(58) Field of Classification Search
CPC ... B60W 2710/0666; B60W 2710/083; B60W 2050/0013; B60W 10/02; B60W 10/023; B60W 10/06; B60W 10/08; B60W 10/26; B60W 20/11; B60W 20/13; B60W 30/1882; B60W 2540/10; B60W 10/11; B60W 20/10; B60W 10/10; B60K 6/387; B60K 6/485; B60K 2006/4825; B60K 6/48; B60K 6/547; B60K 6/24; B60K 6/26; B60K 6/38; Y02T 10/62; B60Y 2200/92

See application file for complete search history.

(56) References Cited

U.S. PATENT DOCUMENTS

| | | | |
|---|---|---|---|
| 8,758,192 B2 | 6/2014 | Smith et al. | |
| 9,132,747 B2* | 9/2015 | Imamura | B60W 10/10 |
| 2014/0236441 A1* | 8/2014 | Sato | B60W 20/00 |
| | | | 903/902 |
| 2017/0247025 A1 | 8/2017 | Velazquez Alcantar et al. | |
| 2019/0184965 A1* | 6/2019 | Kamatani | B60W 10/08 |
| 2019/0291716 A1* | 9/2019 | Kasahara | B60W 10/02 |
| 2021/0380111 A1* | 12/2021 | Tabata | B60K 6/547 |
| 2022/0055610 A1* | 2/2022 | Takada | B60W 20/11 |
| 2022/0355677 A1* | 11/2022 | David | B60L 15/2045 |

* cited by examiner

HYBRID ELECTRIC VEHICLE AND METHOD OF CONTROLLING THE SAME

CROSS REFERENCE TO RELATED APPLICATION

The present application claims priority to Korean Patent Application No. 10-2022-0041752 filed on Apr. 4, 2022, the entire contents of which is incorporated herein for all purposes by this reference.

BACKGROUND OF THE PRESENT DISCLOSURE

Field of the Present Disclosure

The present disclosure relates to a hybrid vehicle and a method of controlling the same, which are capable of more efficiently distributing driving power for respective driving sources.

Description of Related Art

Recently, as there is increasing interest in environment, the number of environmental-friendly vehicles using electric motors as power sources increases. The environmental-friendly vehicle is called a motorized vehicle. The representative examples of the environmental-friendly vehicles include a hybrid electric vehicle (HEV) or an electric vehicle (EV).

Among the environmental-friendly vehicles, the hybrid electric vehicle operates while switching a mode depending on traveling situations between an EV mode in which only a motor operates and an HEV mode in which an engine operates and the motor selectively operates, improving fuel economy.

In some instances, the hybrid electric vehicle utilizes two electric motors. In the instant case, one of the two electric motors is used as a drive motor for transmitting driving power to wheels, and the other of the two electric motors is mainly used to start the engine or generate electric power by use of power of the engine and thus called a hybrid starter generator (HSG). The hybrid starter generator is connected to the engine through a pulley and a belt and used only for restrictive purposes such as the above-mentioned functions of starting the engine and generating electric power and a function of controlling an engine speed. However, the hybrid starter generator generally does not transmit driving power to the wheel. This is because a belt slip may occur on the pulley, responsiveness and durability deteriorate, and precise control is difficult. Furthermore, because a pulley of an engine shaft is smaller than a pulley of a motor shaft, the motor revolutions per minute (RPM) is higher than the engine RPM. For the present reason, the hybrid starter generator hardly generates a substantial output in a situation in which the engine RPM is high.

Therefore, there is a demand for a hybrid electric vehicle and a method of controlling the same, which are configured for efficiently using power of the two motors.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hybrid electric vehicle and a method of controlling the same, which are configured for more efficiently using power of a motor.

The present disclosure is also intended to provide a hybrid electric vehicle and a method of controlling the same, which are configured for more efficiently distributing driving power for respective driving sources in an HEV mode.

Technical problems to be solved by the present disclosure are not limited to the above-mentioned technical problems, and other technical problems, which are not mentioned above, may be clearly understood from the following descriptions by those skilled in the art to which the present disclosure pertains.

According to one aspect, there is provided a method of controlling a hybrid electric vehicle, the method including: determining an engine operating point of an engine in a hybrid electric vehicle (HEV) mode; and determining first torque for a first motor and second torque for a second motor based on engine torque according to the engine operating point, required torque, and a speed of an input end of a transmission, in which the first motor is directly connected to the engine, the second motor is directly connected to the input end of the transmission, and the first motor and the second motor are connected in a predetermined drive mode using driving power of the engine.

For example, the determining of the first torque and the second torque may include determining the first torque and the second torque so that a value made by subtracting the engine torque according to the engine operating point from the required torque becomes a sum of the first torque and the second torque.

For example, the determining of the first torque and the second torque may be performed to determine the first torque and the second torque so that maximum system efficiency is implemented.

For example, the determining of the first torque and the second torque may include: determining the first torque corresponding to an optimum operating point of the first motor; and determining the second torque depending on the first torque determined to correspond to the optimum operating point.

For example, the method may further include, when an output restriction is applied to one of the first motor and the second motor, correcting an operating point of a remaining one of the first motor and the second motor.

For example, the output restriction may include a maximum torque restriction, and the correcting of the operating point may include applying a larger value between 0 and a value, which is made by subtracting the engine torque, torque of the remaining motor, and maximum torque of the one motor from the required torque, to torque of the remaining motor.

For example, the output restriction may include a minimum torque restriction, and the correcting of the operating point may include applying a smaller value between 0 and a value, which is made by subtracting the engine torque, torque of the remaining motor, and minimum torque of the one motor from the required torque, to torque of the remaining motor.

For example, the method may further include: when a system restriction is applied, applying total compensation requirement torque according to the system restriction to the first torque and the second torque depending on a preset compensation ratio; and adjusting the engine torque based on the total compensation requirement torque.

For example, the determining of the engine operating point may include determining an optimum operating point, in respect to the required torque and the speed of the input end of the transmission, as the engine operating point.

According to various aspects of the present disclosure, there is provided a hybrid electric vehicle including: an engine; a first motor directly connected to the engine; a second motor connected to the first motor in a drive mode using driving power of the engine; a transmission including an input end directly connected to the second motor; and a control unit configured to determine an engine operating point in the predetermined drive mode and determine first torque for a first motor and second torque for a second motor based on engine torque according to the engine operating point, required torque, and a speed of the input end of the transmission.

For example, the control unit may determine the first torque and the second torque so that a value made by subtracting the engine torque according to the engine operating point from the required torque becomes a sum of the first torque and the second torque.

For example, the control unit may determine the first torque and the second torque so that maximum system efficiency is implemented.

For example, the control unit may determine the first torque corresponding to an optimum operating point of the first motor and determine the second torque depending on the first torque determined to correspond to the optimum operating point.

For example, when an output restriction is applied to one of the first motor and the second motor, the control unit may correct an operating point of a remaining one of the first motor and the second motor.

For example, the output restriction may include a maximum torque restriction, and the control unit may apply a larger value between 0 and a value, which is made by subtracting the engine torque, torque of the remaining motor, and maximum torque of the one motor from the required torque, to torque of the remaining motor.

For example, the output restriction may include a minimum torque restriction, and the control unit may apply a smaller value between 0 and a value, which is made by subtracting the engine torque, torque of the remaining motor, and minimum torque of the one motor from the required torque, to torque of the remaining motor.

For example, when a system restriction is applied, the control unit may apply total compensation requirement torque according to the system restriction to the first torque and the second torque depending on a preset compensation ratio and adjust the engine torque based on the total compensation requirement torque.

For example, the control unit may determine an optimum operating point, in respect to the required torque and the speed of the input end of the transmission, as the engine operating point.

For example, the hybrid electric vehicle may further include an engine clutch disposed between the first motor and the second motor.

According to various embodiments of the present disclosure described above, the hybrid electric vehicle may more efficiently travel.

According to an exemplary embodiment of the present disclosure, the first motor is directly connected to the engine. Therefore, it is possible to implement high responsiveness and output torque even though the engine has comparatively high RPM. Therefore, both the first and second motors may output driving power in accordance with the situation, and the operating points for the respective driving sources may be determined in consideration of the system efficiency and the torque restriction for the respective driving sources.

The effects obtained by the present disclosure are not limited to the aforementioned effects, and other effects, which are not mentioned above, will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
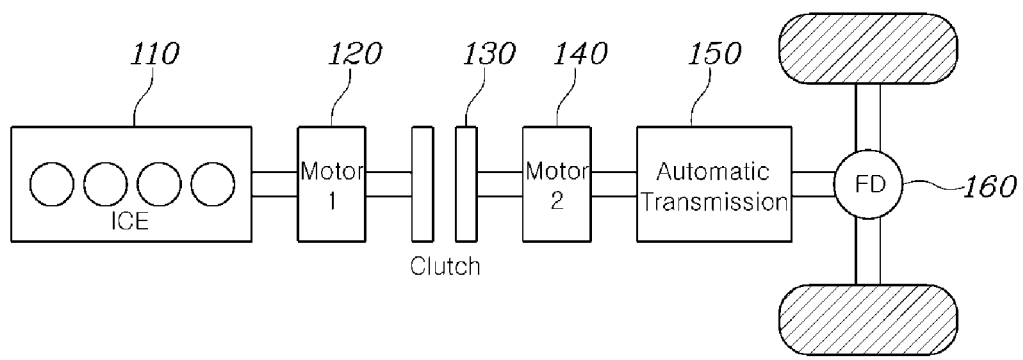
FIG. 1 is a view exemplarily illustrating an example of a configuration of a powertrain apparatus of a hybrid electric vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. The same or similar constituent elements are assigned with the same reference numerals regardless of reference numerals, and the repetitive description thereof will be omitted. The suffixes 'module', 'unit', 'part', and 'portion' used to describe constituent elements in the following description are used together or interchangeably to facilitate the description, but the suffixes themselves do not have distinguishable meanings or functions. Furthermore, in the description of the exemplary embodiment included in the present specification, specific descriptions of publicly known related technologies will be omitted when it is determined that the specific descriptions may obscure the subject matter of the exemplary embodiment included in the present specification. Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure.

The terms including ordinal numbers such as 'first', 'second', and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Furthermore, the term "control unit" or "unit" including "motor control unit (MCU)" or "hybrid control unit (HCU)" is merely a term widely used to name a control device (controller or control unit) for controlling a particular vehicle function but does not mean a generic function unit. For example, the control unit may include a communication device configured to communicate with another control unit or a sensor to control a corresponding function, a memory configured to store an operating system, a logic command, and input/output information, and one or more processors configured to perform determination, computation, decision, or the like required to control the corresponding function.

A structure of a hybrid electric vehicle and a control system, which may be applied to the embodiments, will be described first before a method of controlling the hybrid electric vehicle according to the exemplary embodiment of the present disclosure will be described.

FIG. 1 is a view exemplarily illustrating an example of a configuration of a powertrain apparatus of a hybrid electric vehicle according to an exemplary embodiment of the present disclosure.

FIG. 1 illustrates a powertrain apparatus of a hybrid electric vehicle adopting a parallel type hybrid system in which two motors 120 and 140 and an engine clutch 130 are mounted between an internal combustion engine (ICE) 110 and a transmission apparatus 150. The parallel type hybrid system is also called a transmission mounted electric drive (TMED) hybrid system because the motor 140 is connected to an input end of the transmission apparatus 150 at normal times.

In the instant case, the first motor 120 of the two motors 120 and 140 is disposed between the engine 110 and one end portion of the engine clutch 130. An engine shaft of the engine 110 and a first motor shaft of the first motor 120 may be directly connected to each other and rotated together at normal times.

One end portion of a second motor shaft of the second motor 140 may be connected to the other end portion of the engine clutch 130, and the other end portion of the second motor shaft may be directly connected to the input end of the transmission apparatus 150.

The second motor 140 produces a higher output than the first motor 120. The second motor 140 is configured as a drive motor. Furthermore, the first motor 120 is configured as a starter motor configured for cranking the engine 110 at the time of starting the engine 110. At the time of turning off the engine, the first motor 120 may recover rotational energy of the engine 110 while generating electric power. The first motor 120 may also generate electric power by use of power of the engine 110 in a state in which the engine 110 operates.

In the case of the hybrid electric vehicle including the powertrain apparatus illustrated in FIG. 1, when a driver pushes an accelerator pedal after the engine start (e.g., HEV Ready), the second motor 140 operates first by use of electric power of a battery in a state in which the engine clutch 130 is opened. Therefore, the wheels move as power of the second motor 140 is transmitted to the wheels through the transmission apparatus 150 and a final drive (FD) 160 (i.e., in an EV mode). When the vehicle gradually requires higher driving power as the vehicle slowly accelerates, the first motor 120 may operate to crank the engine 110.

When a difference in rotation speed between the engine 110 and the second motor 140 is within a predetermined range after the engine 110 is started, the engine clutch 130 engages, and the engine 110 and the second motor 140 rotate together (i.e., transition from the EV mode to the HEV mode). Therefore, the output of the second motor 140 decreases as a torque blending process is performed. The output of the engine 110 increases so that the driver's required torque may be satisfied. In the HEV mode, the engine 110 may satisfy most of the required torque. A difference between the engine torque and the required torque may be compensated by at least one of the first motor 120 and the second motor 140. For example, when the engine 110 outputs torque higher than the required torque in consideration of efficiency of the engine 110, the first motor 120 or the second motor 140 generates electric power corresponding to a surplus of engine torque. When the engine torque is lower than the required torque, at least one of the first motor 120 and the second motor 140 may output a shortage of torque.

When a preset engine-off condition is satisfied as the vehicle decelerates, the engine clutch 130 is opened, and the engine 110 is stopped (i.e., transition from the HEV mode to the EV mode). While the vehicle decelerates, the battery is charged by use of driving power of the wheel by the second motor 140, and the present process is called braking energy regeneration or regenerative braking.

In general, a stepped transmission or a multi-plate clutch, for example, a dual-clutch transmission (DCT) may be used as the transmission apparatus 150.

Figure 2:
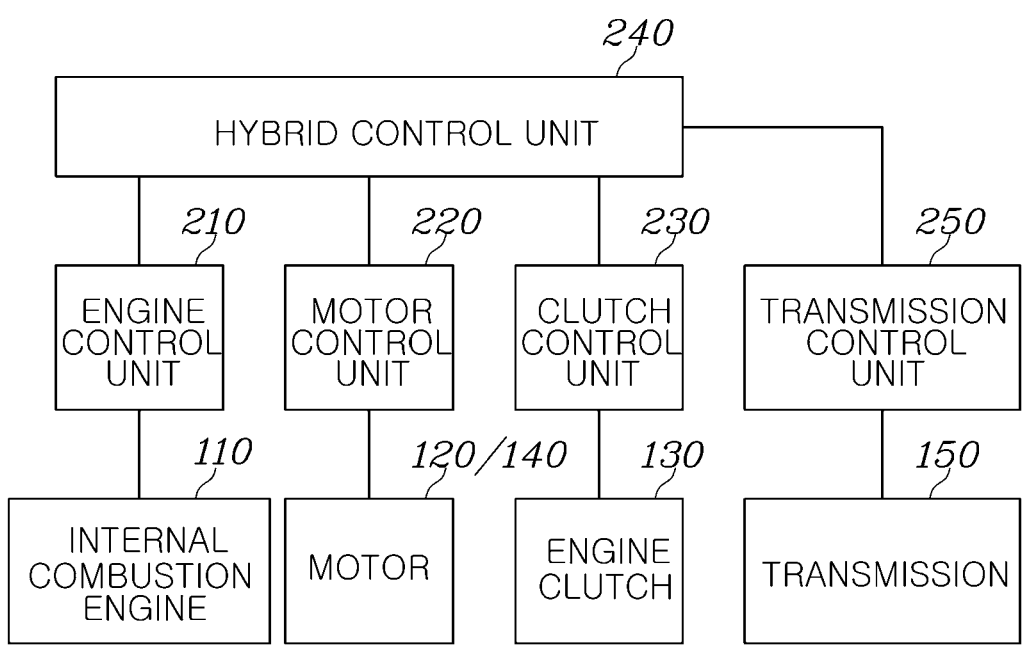
FIG. 2 is a view exemplarily illustrating an example of a configuration of a control system of the hybrid electric vehicle according to the exemplary embodiment of the present disclosure.

FIG. 2 is a view exemplarily illustrating an example of a configuration of a control system of the hybrid electric vehicle according to the exemplary embodiment of the present disclosure.

Referring to FIG. 2, in the hybrid electric vehicle to which the exemplary embodiments of the present disclosure may be applied, an engine control unit 210 may control the internal combustion engine 110, a motor control unit (MCU) 220 may control torque of the first motor 120 and the second motor 140, and a clutch control unit 230 may control the engine clutch 130. In the instant case, the engine control unit 210 is also called an engine management system (EMS). Furthermore, a transmission control unit 250 is configured to control the transmission apparatus 150.

The motor control unit 220 may control a gate drive unit in respect to a control signal in a pulse width modulation (PWM) manner based on motor angles, phase voltage, phase current, required torque, and the like of the motors 120 and 140. Therefore, the gate drive unit may control inverters for driving the motors 120 and 140.

The control units are high-level control units and connected to a hybrid control unit (HCU) 240 that is configured to control overall operations of the powertrain apparatus including the process of switching the modes. The control units may perform the operations in response to the control signal or provide the hybrid control unit 240 with information required to switch the drive mode and control the engine clutch to shift gears under the control of the hybrid control unit 240 and/or information required to control and stop the engine.

For example, the hybrid control unit 240 determines whether to switch the mode between EV-HEV modes or CD-CS modes (in the case of a PHEV) depending on the operating state of the vehicle. To the present end, the hybrid control unit is configured to determine a point in time at which the engine clutch 130 disengages (open), and the hybrid control unit is configured to control a hydraulic pressure when the engine clutch 130 disengages. Furthermore, the hybrid control unit 240 may determine a state (lock-up, slip, open, or the like) of the engine clutch 130 and control a point in time at which a process of injecting fuel into the engine 110 is stopped. Furthermore, the hybrid control unit may control recovery of rotational energy of the engine by providing the motor control unit 220 with a torque command for controlling torque of the first motor 120 to stop and control the engine. Furthermore, to satisfy the required torque, the hybrid control unit 240 may determine states of the respective driving sources 110, 120, and 140, determine required driving power assigned to the respective driving sources 110, 120, and 140, and transmit torque commands to the control units 210 and 220 for controlling the respective driving sources.

Of course, connection relationship between the above-mentioned control units and the function/classification of the control units are exemplarily provided, and it is apparent to those skilled in the art that the present disclosure is not limited even by the names of the control units. For example, any one of the other control units except for the hybrid control unit 240 may be replaced in function for the hybrid control unit 240, and the corresponding function of the hybrid control unit 240 may be distributed to two or more of the other control units.

The configuration illustrated in FIG. 1 and FIG. 2 is just an example of the configurations of the hybrid electric vehicle, and it is apparent to those skilled in the art that the hybrid electric vehicle applicable to the exemplary embodiment of the present disclosure is not limited to the above-mentioned structure.

The exemplary embodiment of the present disclosure proposes a method of determining optimum operating points for the respective motors based on the required torque and the engine operating point, correcting the determined operating points in consideration of torque restrictions for the respective motors, and performing torque compensation on the corrected operating points in consideration of system restrictions, determining the operating points for the respective motors in the HEV mode.

First, an example of a torque distribution pattern for the respective driving sources for satisfying the required torque for the hybrid electric vehicle according to the exemplary embodiment of the present disclosure will be described with reference to FIG. 3.

Figure 3:
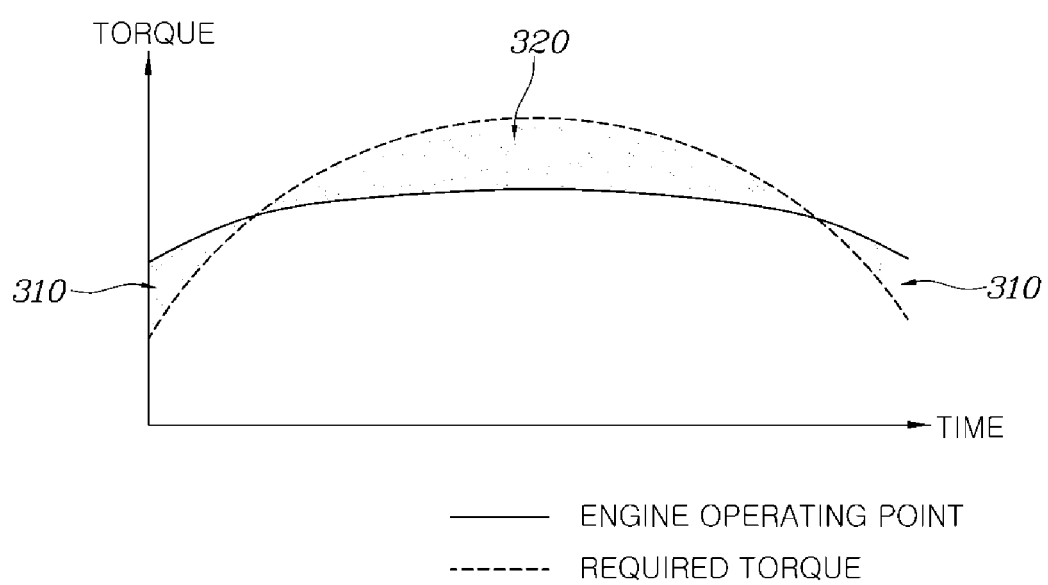
FIG. 3 is a view exemplarily illustrating an example of a torque distribution pattern for respective driving sources in the hybrid electric vehicle according to the exemplary embodiment of the present disclosure.

FIG. 3 is a view exemplarily illustrating an example of a torque distribution pattern for respective driving sources in the hybrid electric vehicle according to the exemplary embodiment of the present disclosure.

The hybrid control unit 240 determines required torque based on an accelerator pedal position sensor value (APS) made by the driver and performs torque distribution for the respective driving sources so that a value made by summing up torque outputted from the respective driving sources becomes the required torque. For example, when the required torque increases and then decreases as the time elapses as illustrated in FIG. 3, the operating point of the engine 110 may be determined as an optimum operating point which is best in efficiency with respect to the engine speed. Therefore, when the engine torque at the engine operating point is higher than the required torque (310), the motors 120 and 140 need to generate electric power by the difference. When the engine torque is lower than the required torque (320), the motors 120 and 140 need to output driving power by the shortage of the torque. In the instant case, the reason why the operating point of the engine 110 is determined first is that the engine 110 is relatively poorer in efficiency than the motors 120 and 140, and the driving source, which is poor in efficiency, may be operated first with optimum efficiency, improving the entire system efficiency.

Next, efficiency characteristics of the motor will be described with reference to FIG. 4.

Figure 4:
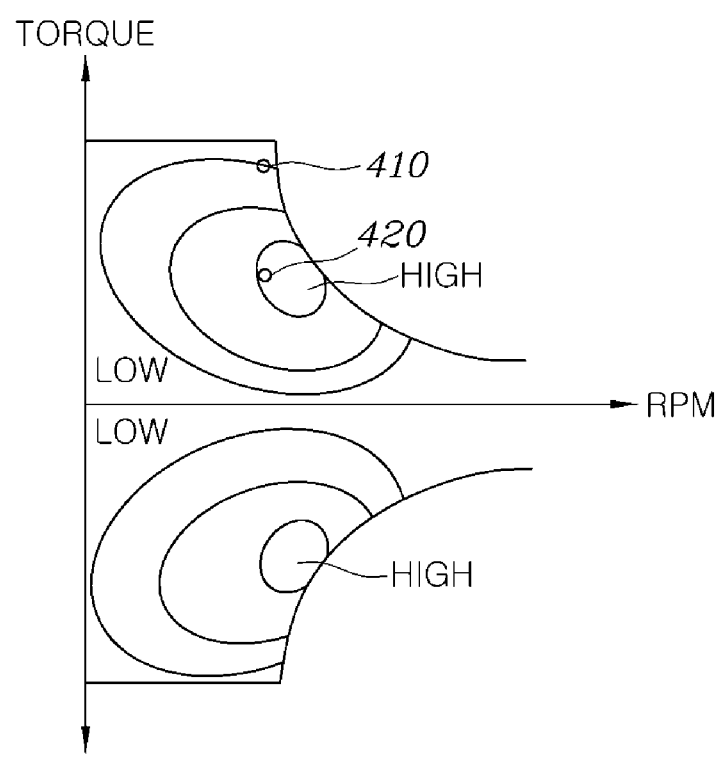
FIG. 4 is a view exemplarily illustrating an example of an RPM-torque graph showing efficiency characteristics of a general motor.

FIG. 4 is a view exemplarily illustrating an example of an RPM-torque graph showing efficiency characteristics of a general motor.

A hybrid system in general, in which only a single drive motor may output driving power, does not have high efficiency at the time of outputting torque 410 approximating the maximum torque of the motor. In contrast, the hybrid system illustrated in FIG. 1 may output driving power from the first motor 120 and the second motor 140. Therefore, even though the motors 120 and 140 equally share the torque and output the constant summed-up torque, the control may be performed at the operating point 420 with high efficiency in accordance with the situation. As a result, the hybrid system according to the exemplary embodiment of the present disclosure determines the operating points of the first and second motors 120 and 140 in consideration of the difference of torque according to the engine operating point with respect to the required torque and the speed of the input end of the transmission, further optimizing the system efficiency.

That is, referring to the above-mentioned contents described with reference to FIG. 3 and FIG. 4, the hybrid control unit 240 may determine the engine operating point first in consideration of the required torque and the RPM of the input end of the transmission in the HEV mode and then distribute the difference between the required torque and the engine torque according to the engine operating point in consideration of the efficiency of the first and second motors 120 and 140 so that the system efficiency is optimized. In the instant case, when a torque restriction is applied to the first motor 120 or the second motor 140, the hybrid control unit 240 may correct the operating points for the respective motors in consideration of the torque restriction. Hereinafter, the correction of the operating points according to the exemplary embodiment of the present disclosure in accordance with the torque restriction will be described.

The torque restriction may be applied to the first motor 120 or the second motor 140 because of breakdowns or overheating of the motors or the inverter for operating each of the motors. Therefore, in some instances, the required torque may not be satisfied even though maximum or minimum torque, which corresponds to a limit value, is outputted. In the instant case, to reduce deterioration in drivability or the driver's heterogeneity, it is necessary to satisfy the required torque by correcting the operating point. The method of correcting the operating points according to the exemplary embodiment will be described below.

First, when the maximum torque of the second motor 140 is restricted, the first motor 120 needs to correct the torque difference (generally, a shortage). Therefore, the correction torque of the first motor 120 may be obtained as 'Max ({required torque−engine torque−first motor optimum operating point torque}−second motor maximum torque, 0)'. That is, the torque to be assigned to the second motor 140 in the normal state is determined by '{required torque −engine torque −first motor optimum operating point torque}'. In the instant case, the correction torque of the first motor 120 may be obtained by subtracting the maximum torque of the second motor 140 according to the torque restriction from the above-mentioned value. If the subtraction result indicates that the above-mentioned value is less than 0, this means that the correction is not needed, and the correction torque of the first motor 120 becomes 0.

Similarly, when the minimum torque of the second motor 140 is restricted, the first motor 120 needs to correct the torque difference (generally, an excess). Therefore, the correction torque of the first motor 120 may be obtained as 'Min ({required torque −engine torque −first motor optimum operating point torque}−second motor minimum torque, 0)'. That is, the torque to be assigned to the second motor 140 in the normal state is determined by '{required torque −engine torque −first motor optimum operating point torque}'. In the instant case, the correction torque of the first motor 120 may be obtained by subtracting the minimum torque of the second motor 140 according to the torque restriction from the above-mentioned value. If the subtraction result indicates that the above-mentioned value is more than 0, this means that the correction is not needed, and the correction torque of the first motor 120 becomes 0.

On the other hand, when the maximum torque of the first motor 120 is restricted, the second motor 140 needs to correct the torque difference (generally, a shortage). Therefore, the correction torque of the second motor 140 may be obtained as 'Max ({required torque −engine torque −second motor optimum operating point torque}−first motor maximum torque, 0)'. That is, the torque to be assigned to the first motor 120 in the normal state is determined by '{required torque −engine torque −second motor optimum operating point torque}'. In the instant case, the correction torque of the second motor 140 may be obtained by subtracting the maximum torque of the first motor 120 according to the torque restriction from the above-mentioned value. When the subtraction result indicates that the above-mentioned value is less than 0, this means that the correction is not needed, and the correction torque of the second motor 140 becomes 0.

Similarly, when the minimum torque of the first motor 120 is restricted, the second motor 140 needs to correct the torque difference (generally, an excess). Therefore, the correction torque of the second motor 140 may be obtained as 'Min ({required torque−engine torque−second motor optimum operating point torque}−first motor minimum torque, 0)'. That is, the torque to be assigned to the first motor 120 in the normal state is determined by '{required torque−engine torque−second motor optimum operating point torque}'. In the instant case, the correction torque of the second motor 140 may be obtained by subtracting the minimum torque of the first motor 120 according to the torque restriction from the above-mentioned value. If the subtraction result indicates that the above-mentioned value is more than 0, this means that the correction is not needed, and the correction torque of the second motor 140 becomes 0.

An exemplary embodiment of the correction according to the torque restriction will be described with reference to FIG. 5.

Figure 5:
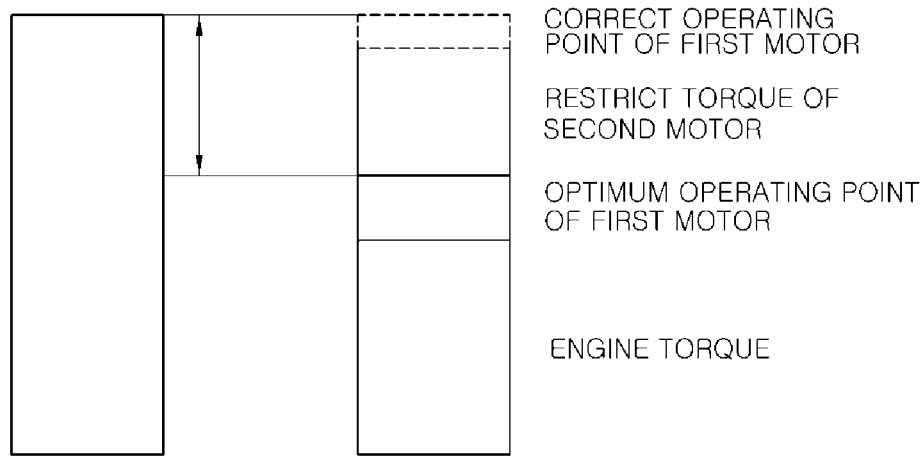
FIG. 5 is a view exemplarily illustrating an example of a process of correcting an operating point of a first motor according to a restriction on torque of a second motor according to the exemplary embodiment of the present disclosure.

FIG. 5 is a view exemplarily illustrating an example of a process of correcting an operating point of a first motor according to a restriction on torque of a second motor according to the exemplary embodiment of the present disclosure.

Referring to FIG. 5, it is assumed that torque corresponding to the optimum operating point of the engine 110 according to the current speed of the input shaft of the transmission is 150 Nm in a situation in which the required torque is 300 Nm. In the present situation, the summed-up torque of the first and second motors 120 and 140 needs to be 150 Nm to satisfy the required torque. However, when the torque corresponding to the optimum efficiency operating point of the first motor 120 is 40 Nm in a case in which no torque restriction occurs on any motor, the hybrid control unit 240 may just distribute torque of 110 Nm to the second motor 140. However, when the torque restriction occurs on the second motor 140 and the maximum torque is 100 Nm or less, the correction torque of the first motor 120 is obtained as 'Max ({required torque−engine torque−first motor optimum operating point torque}−second motor maximum torque, 0)' as described above. That is, because of 'Max({300 −150-40}−100, 0)' and 'Max (10, 0)', the correction torque of the first motor 120 becomes 10 Nm.

As a result, the correction torque of 10 Nm is further assigned to the first motor in addition to existing 40 Nm so that a total of 50 Nm of the required torque is assigned to the first motor.

Meanwhile, in the exemplary embodiment of the present disclosure, torque compensation according to a system restriction may be applied. In the instant case, the system restriction does not mean the restriction applied to the situations of the individual motors but means a restriction situation that affects in common the two motors 120 and 140, such as deterioration in state of charge (SOC) value of the battery or restriction to the amount of discharge of the battery.

In the instant case, the hybrid control unit 240 reduces total compensation requirement torque by assigning the total compensation requirement torque to the first and second motors 120 and 140 depending on a preset compensation ratio. The hybrid control unit 240 may assign total compensation requirement torque, which is reduced by the subtraction of torque shared by the two motors, to the engine 110. For example, assuming that k is the torque compensation ratio (here, 0<k<1), the compensation torque of the respective motors is as follows.

Compensation torque of first motor 120=$k*${total compensation requirement torque}

Compensation torque of second motor 140=$(1-k)*${total compensation requirement torque}

An exemplary embodiment of the compensation according to the system restriction will be described with reference to FIG. 6.

Figure 6:
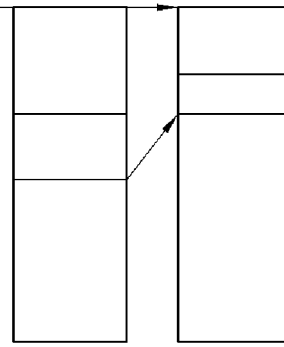
FIG. 6 is a view exemplarily illustrating an example of a process of applying compensation torque for the respective motors according to a system restriction according to the exemplary embodiment of the present disclosure.

FIG. 6 is a view exemplarily illustrating an example of a process of applying compensation torque for the respective motors according to a system restriction according to the exemplary embodiment of the present disclosure.

Referring to FIG. 6, it is assumed that torque corresponding to the optimum operating point of the engine 110 according to the current speed of the input shaft of the transmission is 150 Nm in a situation in which the required torque is 300 Nm. In the present situation, the summed-up torque of the first and second motors 120 and 140 needs to be 150 Nm to satisfy the required torque. When the torque corresponding to the optimum efficiency operating point of the first motor 120 is 50 Nm in a case in which no restriction occurs on the motors, the hybrid control unit 240 may just distribute torque of 100 Nm to the second motor 140.

However, when total compensation requirement torque of 50 Nm occurs by the system restriction and k is preset to 0.5, the compensation torque of each of the motors becomes 25 Nm based on the above-mentioned determination method. Therefore, final torque of the first motor 120 becomes 25 Nm made by subtracting the compensation torque, and final torque of the second motor 140 becomes 75 Nm made by subtracting the compensation torque.

Meanwhile, since the torque, which needs to be shared by the first and second motors 120 and 140, is reduced by the total compensation requirement torque by the system restriction, the total compensation requirement torque is further assigned to the engine 110 so that final torque of the engine 110 may become 200 Nm.

The method of controlling the hybrid electric vehicle described above is summarized by a flowchart of FIG. 7.

Figure 7:
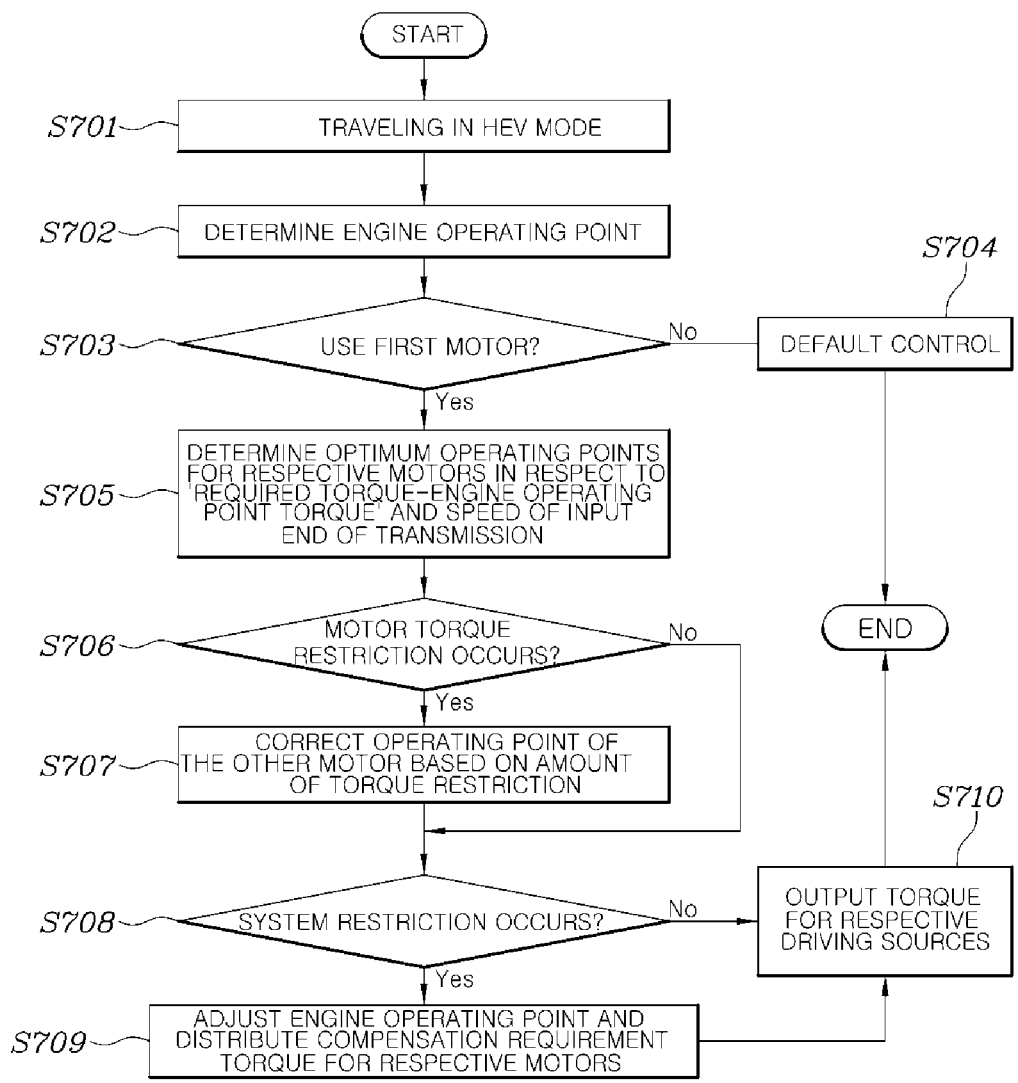
FIG. 7 is a flowchart showing an example of a process of controlling torque distribution for satisfying required torque in the hybrid electric vehicle according to the exemplary embodiment of the present disclosure.

FIG. 7 is a flowchart showing an example of a process of controlling torque distribution for satisfying required torque in the hybrid electric vehicle according to the exemplary embodiment of the present disclosure.

Referring to FIG. 7, the hybrid control unit 240 may determine the engine operating point (S702) based on the speed of the input end of the transmission and the required torque in a situation in which the vehicle travels in the HEV mode (S701).

The torque to be distributed to the first and second motors 120 and 140 may be obtained by subtracting the torque according to the engine operating point from the required torque. In the present situation, the hybrid control unit 240 may determine whether to use the first motor 120 to satisfy the required torque (S703).

For example, the hybrid control unit 240 may determine not to use the first motor 120 to satisfy the required torque when the first motor 120 generates electric power by use of the driving power of the engine because of a low battery SOC. However, the present configuration is just an example, and the present disclosure is not necessarily limited thereto.

When the hybrid control unit 240 determines not to use the first motor 120 (No in S703), default control may be performed to satisfy the required torque only by use of the second motor 140 (S704).

In contrast, when the first motor 120 is used, the hybrid control unit 240 may determine the optimum operating points for the respective motors based on the speed of the input end of the transmission and the value made by subtracting the engine torque according to the engine operating point from the required torque (S705). For example, the hybrid control unit 240 may determine the operating points for the respective motors so that the maximum system efficiency is implemented. The hybrid control unit 240 may distribute the torque, which remains after the optimum efficiency operating point of any one motor (e.g., the first motor) is selected first, to the other motor.

If the torque restriction occurs on any one motor (Yes in S706), the operating point correction may be performed on the motor, on which no torque restriction occurs, based on the amount of torque restriction (S707).

Furthermore, when the system restriction occurs, the operating point of the engine may be adjusted by the total compensation requirement torque, and the compensation torque may be distributed depending on the compensation ratios for the respective motors (S709).

Thereafter, the torque, which is finally determined for the respective driving sources, may be outputted (S710). To the present end, the hybrid control unit 240 may transmit torque commands according to the engine operating point to the engine control unit 210 and transmit torque commands for the respective motors to the motor control unit 220.

According to the exemplary embodiments of the present disclosure described above, the torque may be distributed to the two different motors in consideration of the torque restriction or the system restriction as well as the optimum operating points. Therefore, it is possible to improve system efficiency.

Meanwhile, the present disclosure described above may be implemented as a computer-readable code on a medium on which a program is recorded. The computer-readable medium includes all kinds of storage devices for storing data readable by a computer system. Examples of computer-readable media include hard disk drives (HDDs), solid state disks (SSDs), silicon disk drives (SDDs), ROMs, RAMs, CD-ROMs, magnetic tapes, floppy discs, and optical data storage devices.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a hybrid electric vehicle, the method comprising:
   determining, by a controller, an engine operating point of an engine in a drive mode; and
   determining, by the controller, a first torque for a first motor and a second torque for a second motor based on an engine torque according to the engine operating point, a required torque corresponding to a torque needed to propel the hybrid electric vehicle, and a speed of an input end of a transmission;
   when an output restriction is applied to one of the first motor and the second motor, correcting an operating point of a remaining one of the first motor and the second motor;
   wherein the first motor is directly connected to the engine, the second motor is directly connected to the input end of the transmission, and the first motor and the second motor are connected in a predetermined drive mode using driving power of the engine,
   wherein the output restriction includes a maximum torque restriction, and
   wherein the correcting of the operating point includes applying a larger value between 0 and a value, which is made by subtracting the engine torque, a torque of the remaining motor, and a maximum torque of the one motor from the required torque, to the torque of the remaining motor.

2. The method of claim 1, wherein the determining of the first torque and the second torque includes determining the first torque and the second torque so that a value made by subtracting the engine torque according to the engine operating point from the required torque becomes a sum of the first torque and the second torque.

3. The method of claim 2, wherein the determining of the first torque and the second torque is performed to determine the first torque and the second torque so that maximum system efficiency is implemented.

4. The method of claim 2, wherein the determining of the first torque and the second torque includes:
   determining the first torque corresponding to an optimum operating point of the first motor; and
   determining the second torque depending on the first torque determined to correspond to the optimum operating point.

5. The method of claim 1,
   wherein the output restriction further includes a minimum torque restriction, and
   wherein the correcting of the operating point includes applying a smaller value between 0 and a value, which is made by subtracting the engine torque, the torque of the remaining motor, and a minimum torque of the one motor from the required torque, to the torque of the remaining motor.

6. The method of claim 1, further including:
   when a system restriction is applied, applying a total compensation requirement torque according to the system restriction to the first torque and the second torque depending on a preset compensation ratio; and
   adjusting the engine torque based on the total compensation requirement torque.

7. The method of claim 1, wherein the determining of the engine operating point includes determining an optimum operating point, in respect to the required torque and the speed of the input end of the transmission, as the engine operating point.

8. A non-transitory computer-readable recording medium for storing a program for performing the method of controlling a hybrid electric vehicle of claim 1.

9. A hybrid electric vehicle comprising:
   an engine;
   a first motor directly connected to the engine;
   a second motor connected to the first motor in a predetermined drive mode using driving power of the engine;
   a transmission including an input end directly connected to the second motor; and
   a control unit configured to determine an engine operating point in the predetermined drive mode and determine a first torque for the first motor and a second torque for the second motor based on an engine torque according to the engine operating point, a required torque corresponding to a torque needed to propel the hybrid electric vehicle, and a speed of the input end of the transmission,
   wherein when an output restriction is applied to one of the first motor and the second motor, the control unit is further configured to correct an operating point of a remaining one of the first motor and the second motor,
   wherein the output restriction includes a maximum torque restriction, and
   wherein the control unit is further configured to apply a larger value between 0 and a value, which is made by subtracting the engine torque, a torque of the remaining motor, and a maximum torque of the one motor from the required torque, to the torque of the remaining motor.

10. The hybrid electric vehicle of claim 9, wherein the control unit is further configured to determine the first torque and the second torque so that a value made by subtracting the engine torque according to the engine operating point from the required torque becomes a sum of the first torque and the second torque.

11. The hybrid electric vehicle of claim 10, wherein the control unit is further configured to determine the first torque and the second torque so that maximum system efficiency is implemented.

12. The hybrid electric vehicle of claim 10, wherein the control unit is further configured to determine the first torque corresponding to an optimum operating point of the first motor and determine the second torque depending on the first torque determined to correspond to the optimum operating point.

13. The hybrid electric vehicle of claim 9,
wherein the output restriction further includes a minimum torque restriction, and
wherein the control unit is further configured to apply a smaller value between 0 and a value, which is made by subtracting the engine torque, the torque of the remaining motor, and a minimum torque of the one motor from the required torque, to the torque of the remaining motor.

14. The hybrid electric vehicle of claim 9, wherein when a system restriction is applied, the control unit is further configured to apply a total compensation requirement torque according to the system restriction to the first torque and the second torque depending on a preset compensation ratio and adjust the engine torque based on the total compensation requirement torque.

15. The hybrid electric vehicle of claim 9, wherein the control unit is further configured to determine an optimum operating point, in respect to the required torque and the speed of the input end of the transmission, as the engine operating point.

16. The hybrid electric vehicle of claim 9, further including:
an engine clutch disposed between the first motor and the second motor.

* * * * *